June 24, 1930.  E. R. SPARKS  1,768,011
FORKED KITCHEN UTENSIL
Filed Sept. 22, 1928
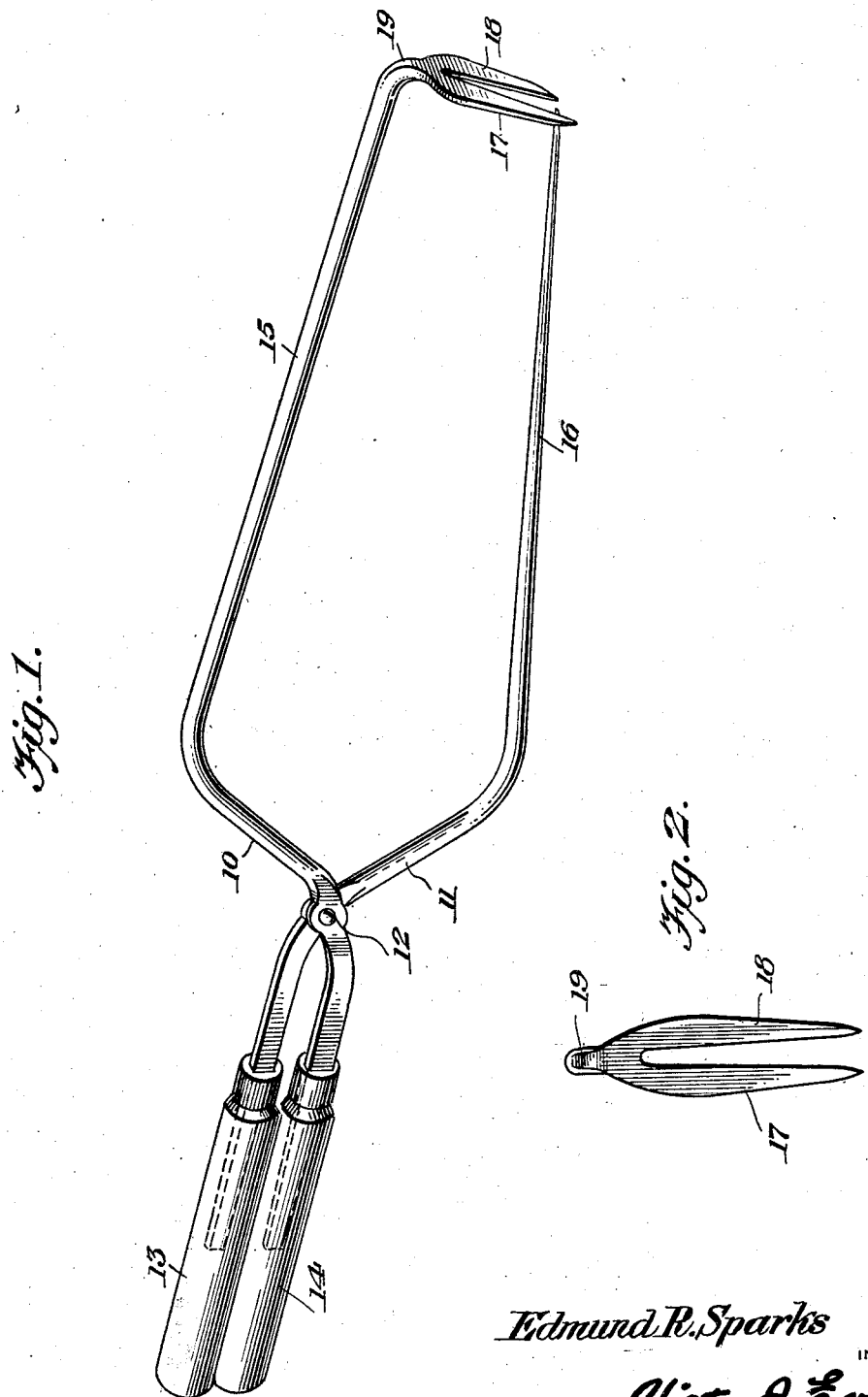
Edmund R. Sparks
INVENTOR
BY Victor J. Evans
ATTORNEY Patented June 24, 1930

1,768,011

UNITED STATES PATENT OFFICE

EDMUND RENDLE SPARKS, OF EDMONTON, ALBERTA, CANADA

FORKED KITCHEN UTENSIL

Application filed September 22, 1928. Serial No. 307,668.

The object of this invention is to provide a fork especially adapted for turning roasts, and for other similar purposes, where a somewhat heavy article of food is to be handled and is likely to slip from a fork of ordinary type or construction.

A further object is to provide an article of this character in which a straight arm or tine is carried by one of the pivoted handle and shank members, and in which the other shank portion terminates in a fork per se, the latter being deflected toward the point of the straight prong or tine.

With the foregoing and other objects in view, the invention consists in the novel construction and arrangement of elements described, illustrated and claimed, it being understood that modifications may be made within the scope of the claim without departing from the spirit of the invention.

In the drawings forming part of this application:—

Figure 1 is a perspective view of the device.

Figure 2 is an end elevation, showing especially the bifurcated element carried by one of the tines.

The device includes a plurality of pivotally connected shank portions 10 and 11, the point of pivotal connection being shown at 12, and those portions of the shank at the left of the pivot in Figure 1 carry handles of suitable type and configuration, these handles being shown at 13 and 14.

Shank portion 10 has formed therewith a tine 15, and shank portion 11 has formed therewith a tine 16, the latter being straight and preferably tapering, as illustrated.

Tine or prong 15 which may be of uniform cross section for the greater portion of its length is deflected at the forward end and is flattened to produce a plate portion, bifurcated as illustrated, and including prongs or tines 17 and 18. These elements last named extend toward the straight prong 16, and the angle at 19 is preferably a right angle, or a sharp curve as illustrated, in order that the flattened fork structure at 17 and 18 may be substantially perpendicular to the tines 15 and 16.

The straight tine terminates about as shown with reference to the ends of tines 17 and 18, so that when the straight tine is forced into the article, such as a piece of roast meat, the prongs 15 and 16 being separated, and the handles likewise separated—the handles will be pressed together for the purpose of closing the elements of the fork, and the tines 17 and 18 will move toward the straight tine and an effective securing device is therefore provided, so that there is no possibility of slipping.

By the use of this device a chef can handle a much greater quantity of food of the character indicated, or of any other kind in a given time, than would otherwise be possible, and any tendency to cause a splashing of the gravy or the like is avoided.

Having described the invention what is claimed is:—

A fork comprising a plurality of pivotally connected elements, one of these elements including a shank and a flat bifurcated end portion at approximately right angles with reference to its shank, and the other of said elements including a tapered shank, terminating at a point adjacent to the bifurcated end portion, when the pivotally connected elements are in closed position.

In testimony whereof I affix my signature.

EDMUND RENDLE SPARKS.